United States Patent [19]

Sassen

[11] Patent Number: 5,587,195
[45] Date of Patent: Dec. 24, 1996

[54] PLASTIC FAT SPREAD COMPRISING A HARDSTOCK

[75] Inventor: Cornelis L. Sassen, Schiedam, Netherlands

[73] Assignee: Van den Bergh Foods Co., Division of Conopco, Inc., Lisle, Ill.

[21] Appl. No.: 437,191

[22] Filed: May 8, 1995

[30] Foreign Application Priority Data

May 10, 1994 [EP] European Pat. Off. .............. 94201322

[51] Int. Cl.$^6$ ...................................... A23D 7/00
[52] U.S. Cl. .......................................... 426/607; 426/611
[58] Field of Search .................................... 426/607, 611

[56] References Cited

U.S. PATENT DOCUMENTS

| | | |
|---|---|---|
| 3,706,578 | 12/1972 | Bence . |
| 4,385,001 | 5/1983 | Rosen ...................................... 260/409 |
| 4,424,162 | 1/1984 | Rosen ...................................... 260/409 |
| 4,424,163 | 1/1984 | Rosen ...................................... 260/409 |
| 4,479,902 | 10/1984 | Rosen ...................................... 260/409 |
| 4,510,091 | 4/1985 | Rosen ...................................... 260/409 |
| 4,510,092 | 4/1985 | Rosen ...................................... 260/409 |
| 5,366,752 | 11/1994 | Cain ........................................ 426/607 |
| 5,385,744 | 1/1995 | Cain ........................................ 426/606 |
| 5,431,948 | 7/1995 | Cain ........................................ 426/606 |
| 5,476,676 | 12/1995 | Cain ........................................ 426/607 |

FOREIGN PATENT DOCUMENTS

| | | |
|---|---|---|
| 089082 | 9/1983 | European Pat. Off. . |
| 233036 | 8/1987 | European Pat. Off. . |
| 470658 | 2/1992 | European Pat. Off. . |
| 49028643 | 7/1974 | Japan . |
| 92/15200 | 9/1992 | WIPO . |
| 92/20236 | 11/1992 | WIPO . |

OTHER PUBLICATIONS

Gunstone 1983 Lipids in Foods Chemistry, Biochemistry and Technology Pergamon Press New York pp. 147–155.
Potter 1978 Food Science 3rd edition AVI Publishing Comp Inc. CT. pp. 478–479.
Inform, "Lauric oil sources", V. 5, No. 2 (Feb. 1994).
*Chemical Abstracts*, vol. 82, No. 21, May 26, 1975, Columbus, OH; "Fatty Oils and Fats Suitable for Puff Pastry Margarine".

*Primary Examiner*—Carolyn Paden
*Attorney, Agent, or Firm*—A. Kate Huffman

[57] ABSTRACT

Fully hardened, but otherwise not chemically treated fat material usable as a hardstock having the following fatty acid composition:

| | |
|---|---|
| $C_{12}$ | 9–45 wt % |
| $C_{14}$ | 1–5% |
| $C_{16}$ | 3–7% |
| $C_{18}$ | >40% |
| others up to 10% | | these fatty acids being arranged in the following triglyceride combinations:

| | |
|---|---|
| $H_3$ | 0–35 wt % |
| HHM | 20–80% |
| MHM | 10–60% |
| $M_3$ | 0–10% |

H representing saturated fatty acids having more than 15 carbon atoms and M saturated acids having 12 or 14 carbon atoms, the sequence of the symbols H and M representing the position of the fatty acids in the triglyceride molecule. A process for producing such fat material and spreads and shortening comprising such fat materials.

6 Claims, No Drawings

PLASTIC FAT SPREAD COMPRISING A HARDSTOCK

FIELD OF THE INVENTION

The invention relates to a fat usable as a hardstock in plastic fat spreads and a method for preparing such a hardstock.

BACKGROUND OF THE INVENTION

Plastic fat spreads are usually composed of an aqueous phase and a fat phase, the latter nowadays comprising a liquid base stock and a smaller amount of a hardstock for structuring the fat phase to give the spread the required plasticity and spreadability.

For nutritional, health and naturalness reasons several requirements are to be pursued

- smallest possible amount of saturated fat
- smallest possible amount of trans unsaturated fat
- highest possible amount of cis unsaturated fat, especially of all-cis polyunsaturated fat
- no use of so called tropical oils
- minimum processing, especially minimum use of chemical treatments.

For satisfying these requirements as far as possible a major measure is using a hardstock having a very efficient structuring capacity whereby a relatively low percentage of hardstock calculated on total fat can be used.

EP 89 082 describes hardstocks that can be used at relatively low amounts in the fat blend of margarines and spreads. At least 55 wt % of the hardstock consists of triglycerides with a carbon number ranging from 44 to 48. These triglycerides comprise predominantly 2 saturated or mono-trans fatty acids with a chain length of 16 or more carbon atoms (indicated by "H") and 1 lauric or myristic fatty acid (indicated by "M"). The hardstock can be prepared by randomly esterifying appropriate fatty acids with glycerol or by randomly interesterifying mixtures of fats such as fully hardened palm kernel fat and palm fat and fractionating the randomized mixture to recover a fraction enriched in the socalled $H_2M$ triglycerides.

EP 233 036 discloses hardstocks given by the expression $Z^2=4$ XY where X=HHH, Y=MHM and Z=HHM. The $\alpha(1,3)$ fatty acids must be randomly distributed which is achieved by means of enzymatic rearrangement of a fat mixture. As source of M acids, tropical oils like coconut, palm kernel and babassu oil are used.

SUMMARY OF THE INVENTION

According to the present invention the above requirements are highly met by a fully hardened, but otherwise not chemically treated fat material having the following fatty acid composition:

| | |
|---|---|
| $C_{12}$ | 9–45% |
| $C_{14}$ | 1–5% |
| $C_{16}$ | 3–7% |
| $C_{18}$ | >40% | others 0–10% and preferably 0–5%, these fatty acids being arranged in the following triglyceride combinations:

| | |
|---|---|
| $H_3$ | 0–35% |
| HHM | 20–80% |
| MHM | 10–60% |
| $M_3$ | 0–10% |

H representing saturated fatty acids having more than 15 carbon atoms and M saturated fatty acids having 12 or 14 carbon atoms, the sequence of the symbols H and M representing the position of the fatty acids in the triglyceride molecule. The sequences 123 and 321 are equivalent for the present purposes, e.g. HHM and MHH are considered to be the same and are jointly represented by HHM. In view of the prescribed fatty acid composition, M consists largely of $C_{12}$ with only a small amount of $C_{14}$, H consists mainly of $C_{18}$, a small amount of $C_{16}$, and possibly a minor amount of $C_{20}$–$C_{24}$ acids.

Preferably the combined amount of $H_3$, HHM, MHM and $M_3$ triglycerides is at least 85%, more preferably 90–100%.

All percentages are percentage by weight.

PREFERRED EMBODIMENTS OF THE INVENTION

Preferably the triglycerides are present in the following combinations:

| | | | |
|---|---|---|---|
| $H_3$ | 2–25% | more preferably | 5–15% |
| HHM | 30–80% | | 40–75% |
| MHM | 10–50% | | 10–30% |
| $M_3$ | 0–5% | | 0–3% |

Preferably the $C_{12}$ content is 10–45%, more preferably 18–40%, the $C_{16}$ content is preferably 3–5% and the $C_{18}$ content is preferably 50–70%.

The invention also relates to a process for producing a fat material usable as a hardstock, said process not involving a blending or (inter)esterification step, by fully hardening an oil having (a) 9–55% of lauric acid, (b) 20–55% of oleic acid, (c) less than 12% of saturated $C_{14-18}$ fatty acids and (d) 15 to 35% of linolenic and linoleic acid; the total of (a) to (d) being more than 90% and preferably more than 95% and optionally fractionating the fully hardened oil and recovering at least one of the fractions. The oil used for this process can conveniently be derived from suitably selected brassica seed, for example as described in WO 92/20236.

The oil preferably contains 10–45%, more preferably 18–40% of lauric acid, the content of $C_{14-16}$ saturated fatty acids is preferaby 4–10%.

The invention also relates to a hardstock material obtainable by one of the preceding processes. Preferably, the fat material of the present invention described above is prepared by means of the present process, with or without a fractionation step.

The hardstock materials of the invention have not been subjected to any chemical modification treatments except hardening. This hydrogenation is carried out to completion. Consequently, the hardstock is substantially free from trans fatty acids. By the combination of triglyceride structure and only small amounts of $C_{14}$ and $C_{16}$ acids an optimum combination is found allowing the formulation of margarines and other spreads with extremely favourable fatty acid profile, as expressed by the Keys number (see below). No tropical oils need to be used. The hardstock can be prepared using only simple processing without the need for complicated esterification or interesterification equipment or sophisticated blending stations.

The invention finally relates to a spread comprising 5–90% fat phase and 95–10% of an aqueous phase, in which the fat phase comprises 4–20%, preferably 6–20% and more preferably 8–14% of a hardstock of claims 1, 2, or 6, the remaining fat being a liquid oil. If necessary the lower percentages may require a fractionation of the hardened fat materials in order to remove the lower melting fractions therefrom. Wet fractionation is most suitable for this purpose.

As liquid oil, preferably low erucic rapeseed, sunflower, safflower, corn or soyabean oil or a mixture of 2 or more thereof is used.

Fully hardening means that the hydrogenation reaction is continued until the reaction is completed as far as is realistically achievable. In practice an iodine value of 0 can rarely be obtained. Preferably, the reaction is continued until the iodine value is less than 3, more preferably less than 2. This means that the hardened fat may still contain a residual amount of unsaturated fatty acids.

In a particularly preferred embodiment the fat of the spread has the following N-line:

| | | |
|---|---|---|
| $N_{10}$ = 6–25% | and preferably | 8–14% |
| $N_{20}$ = 4–20% | | 4–10% |
| $N_{30}$ = 0,5–8% | | 0.5–3% |
| $N_{35}$ = <3.5% | | <2%. |

The fats described in the preceding are not only useful as hardstock materials in fat spreads but equally suited for use as confectionery fats or as a component thereof. In particular the products high in HHM and $H_3$ are suited for that purpose. In addition these fats are suited as component in so-called bloom inhibitors or anti-blooming agents in confectionery fat mixtures.

The invention will hereinafter be explained with the following examples. Parts and percentages refer to weights unless otherwise indicated.

EXAMPLES 1 and 2

A hardstock was produced by fully hardening a high lauric rapeseed oil with the following overall fatty acid composition:

| Fatty acids | Overall |
|---|---|
| C10 (Capric) | 0.1% |
| C12 (Lauric) | 38.8% |
| C14 (Myristic) | 4.4% |
| C16 (Palmitic) | 3.0% |
| C16:1 (Palmitoleic) | 0.2% |
| C18 (Stearic) | 1.4% |
| C18:1 (Oleic) | 31.8% |
| C18:2 (Linoleic) | 12.4% |
| C18:3 (Linolenic) | 6.6% |
| C20 (Arachidic) | 0.4% |
| C20:1 (Eicosenoic) | 0.7% |
| C22 (Behenic) | 0.2% |

The total fatty acid distribution and the fatty acid distribution over the two-position of the fully hardened lauric rapeseed oil is given in the next table:

| Fatty acids | Overall | Two-position |
|---|---|---|
| C10 (Capric) | 0.1% | — |
| C12 (Lauric) | 38.2% | 3.4% |
| C14 (Myristic) | 4.0% | 0.3% |
| C16 (Palmitic) | 3.8% | 0.8% |
| C18 (Stearic) | 52.4% | 95.3% |
| C20 (Arachidic) | 1.3% | 0.2% |
| C22 (Behenic) | 0.2% | — |

Using the 1,3-randomness assumption (Coleman, M. H. and Fulton, w. C., 5th Int. Conf. Biochem. Problems of Lipids, Pergamon Press, London (1961)) the following triglyceride composition was determined:

| Triglyceride group | |
|---|---|
| HHH | 7.8% |
| HHM | 39.1% |
| HMH | 0.4% |
| MHM | 48.6% |
| HMM | 1.9% |
| MMM | 2.3% | with H: saturated fatty acids with a chain length larger than 15

M: saturated fatty acids with chain lengths 12 and 14

The fully hardened lauric rapeseed oil was used as a margarine hardstock on a level of 8% in sunflower oil (example 1) and 10% in sunflower oil (example 2).

The spreads were processed at laboratory scale through a conventional A-A-C sequence with a throughput of 5.5 Kg/hr, an exit temperature on the second A-unit (800 rpm) of 9.7° C., an exit temperature on the C-unit (100 rpm) of 14.5° C.

In this processing equipment the A-unit is a scraped surface heat exchanger and the C-unit a crystalliser unit as is well known in the art of margarine and spreads making. 83.3% fat phase were processed with 16% water, 0.6% whey powder and 0.1% potassium sorbate.

As a comparative example a margarine was produced according to the above description having a fat phase consisting of 13% of a hardstock obtained by random interesterification of equal amounts of palm kernel fat (m.p. 39° C.) and palm fat (m.p. 58° C.), and 87% unhardened sunflower oil.

The fatty acid and triglyceride compositions were:

| Fatty acid | wt % | Triglyceride group | wt % |
|---|---|---|---|
| $C_6$ | 0.1 | HHH | 19.7 |
| $C_8$ | 2.2 | HHM | 24.0 |
| $C_{10}$ | 2.0 | HMH | 12.0 |
| $C_{12}$ | 23.7 | MHM | 7.1 |
| $C_{14}$ | 7.6 | HMM | 14.2 |
| $C_{16}$ | 26.1 | MMM | 4.2 |
| $C_{18}$ | 37.0 | Other# | 18.8 |
| $C_{18:1}$* | 1.0 | | |
| $C_{20}$ | 0.3 | | |

*$C_{18:1}$ includes both oleic (cis) and elaidic (trans) acid
This group includes triglycerides containing 1 or more fatty acids with a chain length of 10 or less carbon atoms and unsaturated acids.

The solid contents, the amounts of saturated fatty acids (SAFA) and the Keys numbers of the three fat phases as well as the physical characteristics of the three produced margarines are given in the next table. The solid contents at 10°, 20°, 30° and 35° C., the N-values, were measured by means of NMR as described in Fette, Seifen, Anstrichmittel 80, (1978), 180–186. The Keys numbers, Kn were calculated according to the formula:

$$Kn = \%C12 + \%C14 + \%C16 + \% \text{ trans fatty acids} - 0.5 * \% \text{ PUFA}.$$

PUFA represents the sum of the percentages of linoleic and linolenic acid.

Hardness (Stevens values) and thinness were determined in samples one week after production.

All products were virtually free of TRANS fatty acids.

| Margarine prepared from | Example 1<br>8 wt % fully hardened lauric rapeseed oil and 92% sunflower oil | Example 2<br>10 wt % fully hardened lauric rapeseed oil and 90% sunflower oil | Comparative example<br>13 wt % interesterified hardstock and 87 wt % sunflower oil |
|---|---|---|---|
| Solids (%) | | | |
| N10 | 9.2 | 11.9 | 12.0 |
| N20 | 4.8 | 6.7 | 7.2 |
| N30 | 1.0 | 2.0 | 3.2 |
| N35 | 0.3 | 0.6 | 0.6 |
| SAFA | 19.6% | 21.3% | 23.8% |
| Keys | −19.5 | −18.0 | −14.2 |
| Stevens (1 wk) | | | |
| St 5 | 58 | 77 | 86 |
| St 10 | 51 | 69 | 66 |
| St 15 | 34 | 50 | 49 |
| St 20 | 16 | 28 | 26 |
| Thinness (1 wk) | | | |
| 34° C. | 92 | 112 | 156 |

It is apparent from this table that margarines produced with a low level of non-interesterified, fully hardened hardstock have equal or almost equal hardness values as the margarine produced with a higher level of the interesterified hardstock. Clearly, the fully hardened hardstock contributes more to the hardness per amount of SAFA.

The use of the fully hardened hardstocks results in fat blends which contain less SAFA, especially less C16, and therefore contributes more to the cholesterol lowering effect which is expressed by the Keys number.

The margarines produced with the non-interesterified, fully hardened hardstock have lower thinness values than the margarine produced witch the interesterified hardstock. This resulted in a significantly improved melting behaviour.

The consistency of the products remained constant upon temperature cycling and after 4 weeks storage.

EXAMPLE 3

The fully hardened lauric rapeseed oil used in examples 1 and 2, was applied as a hardstock at a level of 10% in unhardened sunflower oil. The resulting fat blend was mixed with 65% of a water phase to produce a 35% fat spread.

The water phase (65%) contained:

63.1% water 1.3% gelatin 0.5% skimmed milk powder 0.1% P sorbate

The spread was processed at laboratory scale through a conventional A-A-A-C sequence with a throughput of 3.7 kg/hr, an exit temperature on the third A-unit (1000 rpm) of 9.0° C., an exit temperature on the C-unit (1000 rpm) of 15.9° C.

As a comparative example a 35% spread was produced according to the above description containing a fat phase which consisted of 14% of a hardstock obtained by random interesterification of 57 wt % of a palm kernel fat (m.p. 41° C.) and 43 wt % palm fat (m.p. 58° C.), and 86% sunflower oil.

The fatty acid and triglyceride composition of the hardstock were:

| Fatty acid | wt % | Triglyceride group | wt % |
|---|---|---|---|
| $C_6$ | — | HHH | 16.8 |
| $C_8$ | 2.1 | HHM | 23.3 |
| $C_{10}$ | 2.3 | HMH | 11.6 |
| $C_{12}$ | 25.9 | MHM | 7.9 |
| $C_{14}$ | 8.2 | HMM | 15.8 |
| $C_{16}$ | 23.7 | MMM | 5.4 |
| $C_{18}$ | 36.0 | Other# | 19.2 |
| $C_{18:1}$* | 1.3 | | |
| $C_{20}$ | 0.4 | | |
| $C_{22}$ | 0.1 | | |

*Oleic and Elaidic acid
Triglycerides containing short ($\leq C_{10}$) or unsaturated acids The solid contents, the amounts of saturated fatty acids (SAFA) and the Keys numbers of the two fat phases as well as the physical characteristics of the two produced 35% fat spreads are given in the next table. The solid contents at 10°, 20°, 30° and 35° C., the N-values, were measured by means of NMR as described in Fette, Seifen, Anstrichmittel 80, (1978), 180–186.

Hardness (Stevens values) was determined in samples one week after production.

The hardness values show that the product made with the fully hardened hardstock have, especially at lower temperatures, higher hardness values compared to the spread made with the interesterified hardstock. Again, the fully hardened hardstock contributes more to the hardness per amount of SAFA resulting in a reduced use of hardstock and nutritionally more beneficial products.

The spreads were tested by a panel of experts. Both products showed a good melting behaviour. The spreadability of the product made with the fully hardened hardstock was found to be superior.

Conductivity measurements showed that both products were fat-continuous and remained fat-continuous also after working.

| 35% fat spread prepared from | Example 3<br>10 wt % fully hardened lauric rapeseed oil and 90% sunflower oil | Comparative example<br>14 wt % interesterified hardstock and 86 wt % sunflower oil |
|---|---|---|
| Solids (%) | | |
| N10 | 11.9 | 11.3 |
| N20 | 6.7 | 6.5 |
| N30 | 2.0 | 3.4 |
| N35 | 0.6 | 0.7 |
| SAFA | 21.3% | 24.7 |
| Keys | −18.0 | −13.4 |
| Stevens (1 wk) | | |
| St 5 | 56 | 32 |

-continued

| 35% fat spread prepared from | Example 3 10 wt % fully hardened lauric rapeseed oil and 90% sunflower oil | Comparative example 14 wt % interesterified hardstock and 86 wt % sunflower oil |
|---|---|---|
| St 10 | 52 | 28 |
| St 15 | 48 | 27 |
| St 20 | 26 | 23 |

EXAMPLE 4

A hardstock was produced by fully hardening a rapeseed oil which contained 29.5% lauric acid. This resulted in a hardstock with the following overall fatty acid composition and fatty acid composition at the two-position:

| Fatty acids | Overall | Two-position |
|---|---|---|
| C10 (Capric) | 0.1% | — |
| C12 (Lauric) | 29.5% | 2.6% |
| C14 (Myristic) | 3.5% | 0.3% |
| C16 (Palmitic) | 3.6% | 0.8% |
| C18 (Stearic) | 61.6% | 96.1% |
| C20 (Arachidic) | 1.4% | 0.2% |
| C22 (Behenic) | 0.3% | — |

Using the 1,3-randomness assumption the following triglyceride composition was determined:

| Triglyceride group | |
|---|---|
| HHH | 17.9% |
| HHM | 47.4% |
| HMH | 0.7% |
| MHM | 31.1% |
| HMM | 1.8% |
| MMM | 1.2% | with H: saturated fatty acids with a chain length larger than 15

M: saturated fatty acids with chain lengths 12 and 14

According to the procedure described in example 1, the fully hardened rapeseed oil was used as a margarine hardstock on a level of 9% in sunflower oil. The solids content of the resulting fat blend was:

| N10 | 10.1% |
|---|---|
| N20 | 6.2% |
| N30 | 2.1% |
| N35 | 1.4% |

The SAFA content of the fat blend was 20.5% and its Keys number −19.5.

In addition this fully hardened rapeseed oil was used as a hardstock on a level of 18% in sunflower oil. The solids content of the resulting fat blend was:

| N10 | 19.6% |
|---|---|
| N20 | 15.7% |
| N30 | 8.8% |
| N35 | 3.7% |

This is an excellent fat blend to produce a shortening.

EXAMPLE 5

A hardstock was produced by fully hardening a rapeseed oil which contained 16.1% lauric acid. This resulted in a hardstock with the following overall fatty acid composition and fatty acid composition at the two-position:

| Fatty acids | Overall | Two-position |
|---|---|---|
| C10 (Capric) | 0.1% | — |
| C12 (Lauric) | 16.3% | 1.5% |
| C14 (Myristic) | 1.8% | 0.1% |
| C16 (Palmitic) | 4.5% | 0.9% |
| C18 (Stearic) | 75.3% | 97.3% |
| C20 (Arachidic) | 1.6% | 0.2% |
| C22 (Behenic) | 0.4% | — |

Using the 1,3-randomness assumption the following triglyceride composition was determined:

| Triglyceride group | |
|---|---|
| HHH | 44.9% |
| HHM | 43.0% |
| HMH | 0.9% |
| MHM | 10.2% |
| HMM | 0.9% |
| MMM | 0.2% | with H: saturated fatty acids with a chain length larger than 15

M: saturated fatty acids with chain lengths 12 and 14

The high level of trisaturated triglycerides with a chain length larger than 15, HHH, makes this hardstock less attractive to apply in a spread since this would result in relatively high N30 and N35 values. And thus in a spread with an unfavourable melting behaviour (high thinness values). Therefore the hardstock was fractionated. This resulted in an olein fraction (56% yield) with a much reduced HHH content and an strongly increased HHM content. The fatty acid and triglyceride composition of the olein fraction is given in the following table:

| Fatty acid | wt % | Triglyceride group | wt % |
|---|---|---|---|
| $C_{10}$ | 0.1 | HHH | 20.0% |
| $C_{12}$ | 24.8 | HHM | 60.9% |
| $C_{14}$ | 2.5 | HMH | 1.2% |
| $C_{16}$ | 4.0 | MHM | 16.3% |
| $C_{18}$ | 67.2 | HMM | 1.1% |
| $C_{20}$ | 1.2 | MMM | 0.3% |
| $C_{22}$ | 0.2 | Other | 0.2% |

According to the procedure described in example 1, the fully hardened rapeseed oil was used as a margarine hardstock on a level of 9% in sunflower oil. The solids content of the resulting fat blend was:

| N10 | 10.1% |
|---|---|
| N20 | 7.1% |
| N30 | 2.6% |
| N35 | 1.7% |

The SAFA content of the fat blend was 20.5% and its Keys number −20.1.

EXAMPLE 6

The hardstock of example 1 was fractionated using aceton as solvent. The hardstock to aceton weight ratio was 1:4. The fractionation temperature was 26° C. The stearine yield was 44%. Then the stearine fraction was refined using conventional means. The stearine composition was assessed by means of overall and 2-position analysis and carbonnumber measurement:

| Fatty acids | | Triglycerides | |
| --- | --- | --- | --- |
| $C_{10}$ | 0.1% | $M_3$ | 0.1 |
| $C_{12}$ | 22.7% | MHM | 21.3 |
| $C_{14}$ | 4.1% | MMH | 1.2 |
| $C_{15}$ | 0.1% | HHM | 46.4 |
| $C_{16}$ | 5.8% | HMH | 1.5 |
| $C_{17}$ | 0.1% | $H_3$ | 29.0 |
| $C_{18}$ | 64.2% | Other | 0.5 |
| $C_{18:1}$ | 0.1% | | |
| $C_{19}$ | 0.1% | | |
| $C_{20}$ | 2.2% | | |
| $C_{22}$ | 0.3% | | |
| $C_{24}$ | 0.2% | | |

A margarine fat blend was prepared of 6% of this stearine hardstock and 94% refined sunflower oil. The fat blend had the following properties:

| | | | |
| --- | --- | --- | --- |
| $N_{10}$ | 7.8 | SAFA | 13.6 |
| $N_{20}$ | 4.9 | Keys number | −21.8 |
| $N_{30}$ | 1.7 | | |
| $N_{35}$ | 0.9 | | |

Margarine was prepared from this fat blend as described in example 1. The product had the following properties:

| Stevens (after 1 week) | | |
| --- | --- | --- |
| at | 5° C. | 48 |
| | 10° C. | 43 |
| | 15° C. | 30 |
| | 20° C. | 19 |
| Thinness (after 1 week) | | 96 |

A similar product is prepared except using low erucic rapeseed oil instead of sunflower oil as the liquid oil. The physical properties of the product are very similar, the Keys number is −9.1, while the SAFA content reduces to 8%.

We claim:

1. A spread comprising: 5 to 90% fat phase and 95–10% of an aqueous phase, the fat phase comprising 4–20% of a fully hardened but otherwise not chemically treated fat material used as a hardstock having the following fatty acid composition:

| | |
| --- | --- |
| $C_{12}$ | 9–45 wt % |
| $C_{14}$ | 1–5% |
| $C_{16}$ | 3–7% |
| $C_{18}$ | >40% | others up to 10%, these fatty acids being arranged in the following triglyceride combinations:

| | |
| --- | --- |
| H3 | 0–35 wt % |
| HHM | 20–80% |
| MHM | 10–60% |
| M3 | 0–10% |

H representing saturated acids having more than 15 carbon atoms and M saturated acids having 12 or 14 carbon atoms, the sequence of the symbols H and M representing the position of the fatty acids in the triglyceride molecule, and a liquid oil as the remaining portion of the fat phase.

2. Spread according to claim 1 wherein the fat phase comprises 8–14% hardstock.

3. Spread according to claim 1, having the following N-line

| | | |
| --- | --- | --- |
| $N_{10}$ = | 6–25% and preferably | 8–14% |
| $N_{20}$ = | 4–20% | 4–10% |
| $N_{30}$ = | 0,5–8% | 0.5–3% |
| $N_{35}$ = | <3.5% | <2% |

4. A spread according to claim 1, wherein the fatty acids are arranged in the following triglyceride combinations:

| | |
| --- | --- |
| $H_3$ | 2–25% |
| HHM | 30–80% |
| MHM | 10–50% |
| $M_3$ | 0–5% |

5. A spread comprising: 5 to 90% fat phase and 95–10% of an aqueous phase, the fat phase comprising 4–20% of a fully hardened but otherwise not chemically treated fat material used as a hardstock having the following fatty acid composition:

| | |
| --- | --- |
| $C_{12}$ | 9–45 wt. % |
| $C_{14}$ | 1–5% |
| $C_{16}$ | 3–7% |
| $C_{18}$ | >40% | others up to 10%, these fatty acids being arranged in the following triglyceride combinations:

| | |
| --- | --- |
| $H_3$ | 0–35 wt. % |
| HHM | 20–80% |
| MHM | 10–60% |
| $M_3$ | 0–10% |

H representing saturated acids having more than 15 carbon atoms and M saturated acids having 12 or 14 carbon atoms, the sequence of the symbols H and M representing the position of the fatty acids in the triglyceride molecule, and the remaining fat phase being a liquid oil, the fat material of the spread produced by a process comprising the following steps:
(a) fully hardening, without blending or interesterification or any other chemical treatment, an oil having
  (i) 9–55 wt. % of lauric acid,
  (ii) 20–55% of oleic acid,
  (iii) less than 12% of saturated $C_{14-18}$ fatty acids,
  (iv) 15–35% of linolenic and linoleic acid; the total of (i) to (iv) being more than 90%;
(b) optionally fractionating the fully hardened oil; and
(c) recovering at least one of the fractions of the fractionated oil.

6. A spread according to claim 5, wherein the oil which is fully hardened to form the hardstock is derived from brassica seed.

* * * * *